April 29, 1952  J. P. QUARLES  2,594,992
PRESSURE SPRAY APPARATUS
Filed Jan. 10, 1950  3 Sheets-Sheet 1
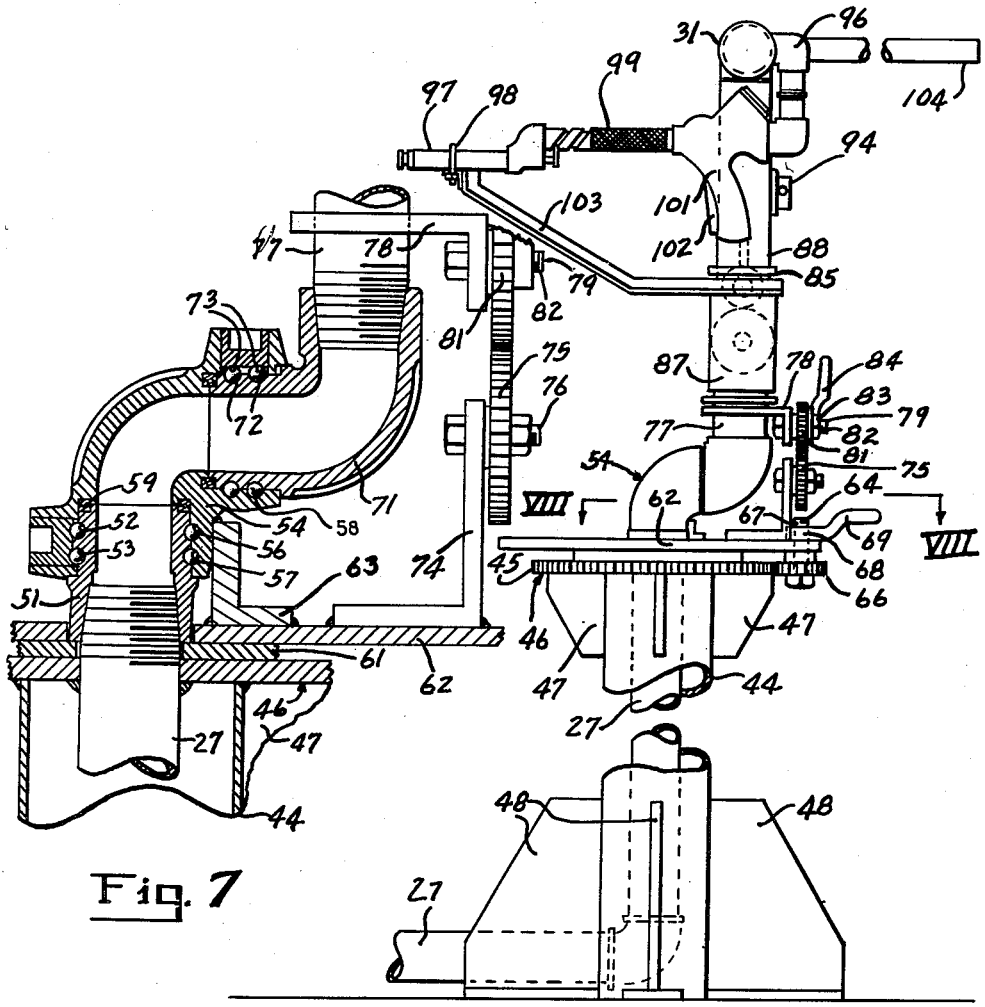
Fig. 7
Fig. 4
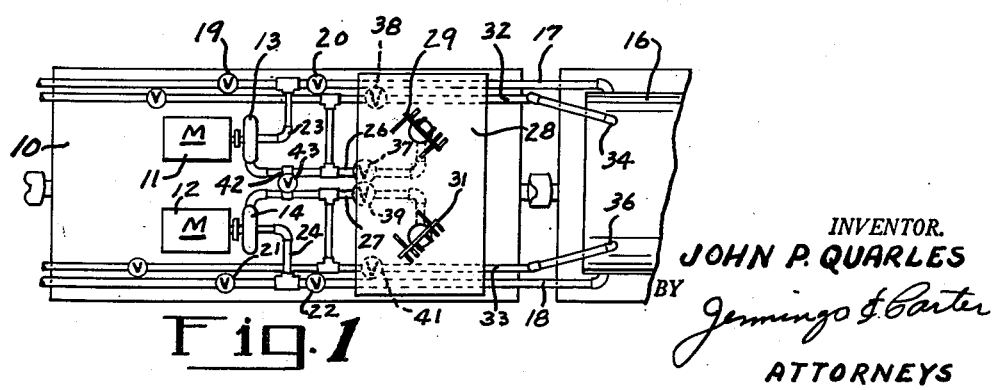
Fig. 1
INVENTOR.
JOHN P. QUARLES
BY Jennings & Carter
ATTORNEYS April 29, 1952      J. P. QUARLES      2,594,992
PRESSURE SPRAY APPARATUS
Filed Jan. 10, 1950      3 Sheets-Sheet 2
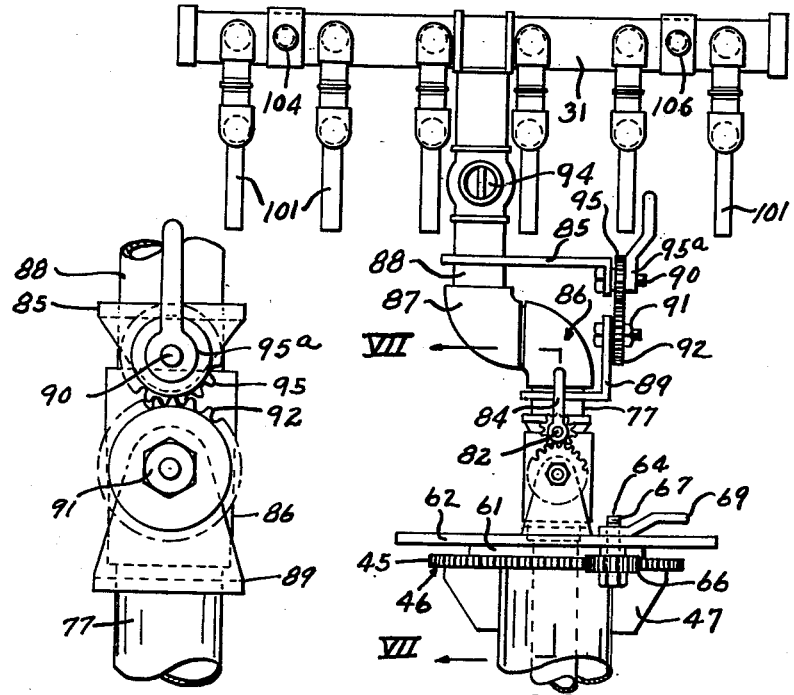
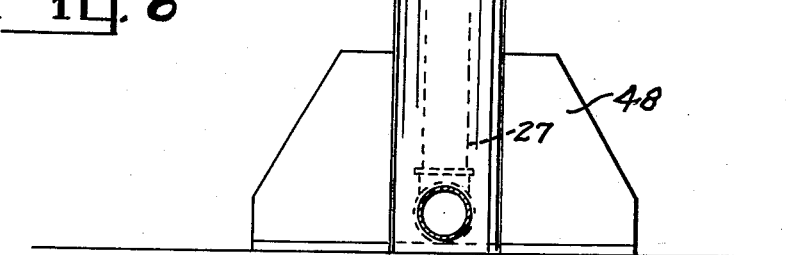
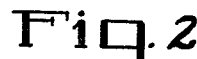
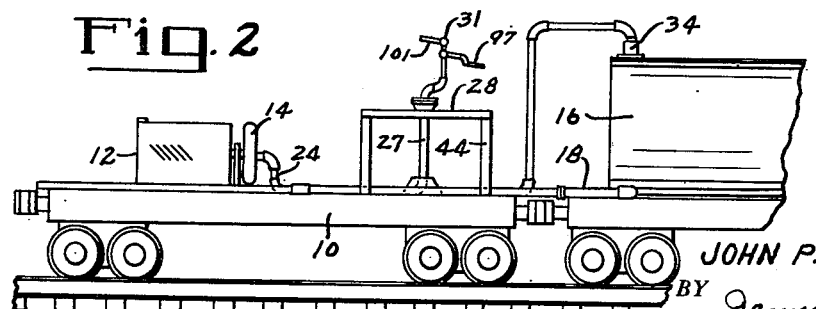
INVENTOR.
JOHN P. QUARLES
BY Jennings & Carter
ATTORNEYS April 29, 1952　　　　　　　　J. P. QUARLES　　　　　　　　2,594,992
PRESSURE SPRAY APPARATUS Filed Jan. 10, 1950　　　　　　　　　　　　　　　　3 Sheets-Sheet 3

INVENTOR.
JOHN P. QUARLES
BY Jennings & Carter
ATTORNEYS

Patented Apr. 29, 1952

2,594,992

UNITED STATES PATENT OFFICE 2,594,992

PRESSURE SPRAY APPARATUS

John P. Quarles, Huntington, W. Va.

Application January 10, 1950, Serial No. 137,720

7 Claims. (Cl. 299—41)

This invention relates to spray apparatus and particularly to apparatus for spraying vegetation, shrubbery and the like occupying relatively wide areas, and has for an object the provision of apparatus of the character designated which shall be simple and sturdy of construction, extremely flexible in operation, and adapted to handle relatively large volumes of liquid at high pressures.

A further object of my invention is to provide spray apparatus which shall embody a multiple nozzle spray head together with an improved mounting and controls therefor whereby the spray head may be readily directed toward any required area and be held stationary in any selected position.

A more specific object of my invention is to provide spray apparatus which shall be adapted for spraying the right of way adjacent railroad tracks and to that end includes pressure creating apparatus and a multiple nozzle spray head which is mounted on a railway vehicle in such position as to enable the operator to cover the widest possible area. The mounting means for the spray head includes means for its manipulation vertically and laterally through an angle of 360° and is thus adapted to cover the widest possible areas at the various elevations encountered along railroad rights of way.

While it is contemplated that my improved apparatus shall be employed in the control of weeds along railroad rights of way, it will be obvious from the detail description which is to follow that it is adapted for a wider field of application and may find use wherever it is required to spray large areas with liquid whether it be for weed control, insecticide control, or for any other purpose.

Apparatus embodying features of my invention is illustrated in the accompanying drawings forming a part of this application in which:

Fig. 1 is a diagrammatic plan view of my improved spray apparatus mounted on a railway vehicle and accompanied by a liquid supply vehicle;

Fig. 2 is a side elevation thereof;

Fig. 4 is a side elevational view showing one of the liquid supply conduits, spray manifold and spray guns;

Fig. 5 is an elevational view taken at right angles to Fig. 4;

Fig. 6 is a detail elevational view, drawn to a larger scale, showing the upper rotary joint in the supply pipe for raising and lowering the spray guns;

Fig. 7 is a sectional view taken along the line VII—VII of Fig. 5;

Figure 3:
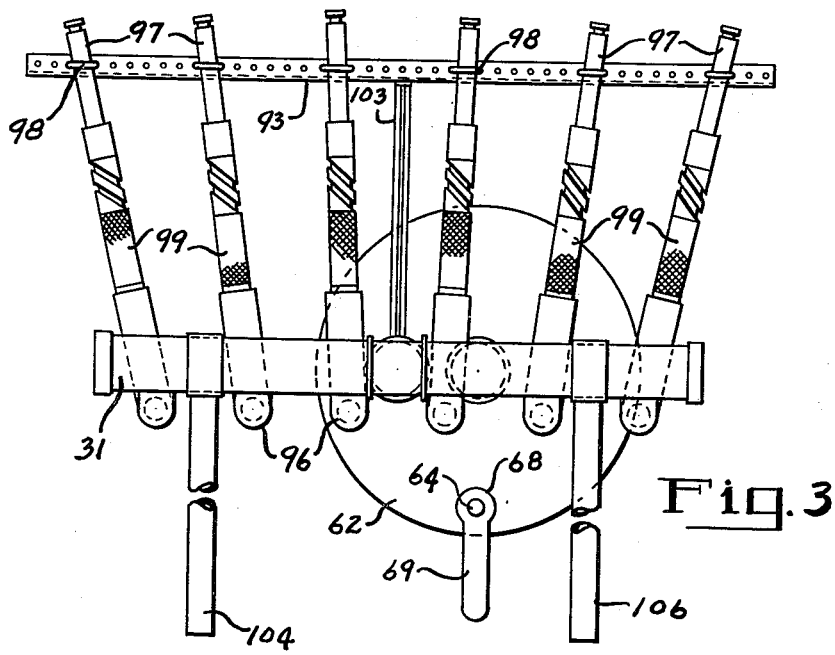
Fig. 3 is a plan view of the spray manifold with the spray guns mounted thereon.

Referring now to the drawings for a better understanding of my invention, I show in Figs. 1 and 2 a railway vehicle 10 having mounted thereon two motors 11 and 12 which drive respectively, pumps 13 and 14. At 16 is shown a fragment of a liquid supply vehicle which is coupled to the vehicle 10. Suitable chemicals in liquid form are carried in the vehicle 16 and are supplied to the pumps 13 and 14 through supply conduits 17 and 18 which conduits extend from end to end of the vehicle 10 so that they may be coupled to a supply vehicle at either end. Suitable valves 19, 20, 21 and 22, as indicated, are interposed in the conduits for controlling the flow of liquid therethrough. Cross conduits 23 and 24 lead respectively from the conduits 17 and 18 to the intakes of the pumps 13 and 14.

The pump 13 discharges liquid through a conduit 26 and the pump 14 discharges liquid through a conduit 27. The conduits 26 and 27 extend upwardly, as shown in Fig. 2, above a platform 28, at an elevation of around five feet above the floor of the vehicle 10. Connected to the upper end of the discharge conduit 26 is a spray manifold 29 and connected to the upper end of the discharge conduit 27 is a spray manifold 31 to be described in detail hereafter. Also connected to the discharge conduits 26 and 27 are conduits 32 and 33 which extend to the end of the vehicle and thence pass upwardly to enter the supply vehicle at 34 and 36. A valve 37 controls the supply of liquid to the manifold 29 and a valve 38 controls the flow of liquid through the conduit 32 to the supply tank. Similarly, a valve 39 controls the flow of liquid to the manifold 31 and a valve 41 controls the supply of liquid to the return conduit 33. In addition, I may provide a cross conduit 42 between the discharge conduits 26 and 27 with a valve 43 therein, whereby the liquid discharged from either pump may be diverted to the discharge system of the other pump.

Inasmuch as the mounting and operating means for both discharge conduits 26 and 27 and their spray manifolds 29 and 31 are identical in construction only one will be described. At 44 I show a supporting stand for the discharge pipe 27. The supporting stand has mounted on its upper end a plate 46 having gear teeth 45 about its periphery. The plate 46 is welded to the supporting stand and to the upper end of the discharge pipe 27, as shown in Fig. 7. Reinforcing gussets 47 and 48 are provided at the upper and lower ends of the supporting stand, as shown in Figs. 4 and 5.

Fixedly secured to the discharge conduit 27, just above the plate 46, is the lower portion 51 of a rotary joint which extends upwardly above the plate 46. Formed in the outer surface of the portion 51 are a pair of ball bearing inner races 52 and 53. Fitting over the portion 51 of the joint is an upper cooperating portion 54 which has formed on its inner surface ball bearing races 56 and 57 corresponding to the races 52 and 53. A plurality of balls 58 are mounted in the races, in a manner well understood. Also formed between the upper portion 54 of the joint and the lower portion 51 is a packing recess 59 in which suitable packing is carried to prevent leakage outwardly of the joint. It will be seen that, by the means shown, the upper portion 54 of the joint described may rotate in a horizontal plane about the lower portion 51.

Mounted over the gear plate 46 is a bronze bearing plate 61 which is rotatable with respect to the lower portion 51 of the joint. Mounted over the plate 61 is a third plate 62 which fits snugly about the lower portion 51 of the joint, but is rotatable with respect thereto. An upstanding bracket 63 is mounted on the plate 62 and is rigidly connected to the upper portion 54 of the rotary joint 51, 54 to support it and rotate with it. Also mounted on the plate 62 is a pinion shaft 64 which extends downwardly therethrough and has mounted on its lower end a pinion 66 which meshes with the gear teeth 45 on the outer periphery of the plate 46. The upper end of the shaft 64 is threaded, as shown at 67, and a nut 68 screws downwardly on the threaded portion of the shaft and is provided with a handle 69 whereby it may be readily manipulated. When the nut 68 is tightened down, it locks the pinion 66 against rotation and therefore holds the upper portion 54 of the joint described against rotation in a horizontal plane with respect to the lower portion thereof.

The upper portion 54 of the joint just described, is turned at right angles to form an L and forms the outer portion of a similar joint rotatable about a vertical plane. The inner portion of the last mentioned joint, which will hereafter be referred to as the intermediate rotary joint, is comprised of an elbow member 71 having formed on its outer surface ball bearing races 72 which cooperate with outer races 73 formed in the portion 54. Inasmuch as the arrangement of the ball bearings, and the packing in this joint are similar to those described for the lower joint, no further detail description will be made.

Mounted on the plate 62 is an upstanding bracket 74 which has journaled in its upper end a shaft 76 having a gear 75, mounted thereon, the axis of which coincides with the axis of rotation of the intermediate joint. The gear 75 is fixedly mounted and does not rotate. Fixedly secured to the elbow member 71 of the intermediate joint, is a section 77 of the discharge pipe to which is fixedly secured a downturned bracket 78 having mounted therein a pinion shaft 79 with a pinion 81 thereon meshing with the gear 75. The outer end of the pinion shaft 79 is threaded as shown at 82 and a nut 83 is provided on the outer end of the pinion shaft whereby it may be tightened down against the pinion 81 and lock it against turning. When allowed to turn, the joint 54, 71 may be turned in a vertical plane. A handle 84 is provided on the nut 83 whereby it may be readily manipulated.

Mounted on the upper end of the section 77 of the discharge pipe is the lower portion 86 of a third rotary joint, which will hereafter be referred to as the upper rotary joint. The upper portion 87 of the upper joint, is rotatable with respect to the lower portion 86, in the same manner as hereinbefore described, but in a vertical plane at right angles to the plane of rotation of the intermediate joint. The portion 86 is fixedly secured to the section 77. Extending upwardly from the portion 87 of the joint is a section 88 of the discharge pipe which is fixedly secured and non-rotatable with respect to the portion 87 of the joint. Fixedly mounted on the section 77 of the discharge pipe is an upturned bracket 89 having a shaft 91 journaled on the upwardly extending portion thereof. A fixed gear 92 is mounted on the shaft 91 with its axis coinciding with the action of rotation of the upper rotary joint. Secured to the section 88 of the discharge pipe is a downturned bracket 85 having a pinion shaft 90 mounted therein with a pinion 95 mounted on the shaft, which meshes with the fixed gear 92. The pinion may be locked against movement by means of a lock nut 95a. The provision of the upper rotary joint just described affords the maximum of flexibility of operation of the spray manifolds. It also affords means whereby the manifold may be tilted with respect to the horizontal when spraying trees, earth banks or other objects on a level with the manifold and thus cover a larger area on such objects.

The section 88 of the discharge pipe extends upwardly and has joined to its upper end the spray manifold 31. A plug valve 94 interposed in the discharge pipe controls the flow of liquid to the manifold. Connected to the spray manifold 31, each by a conduit 96, are a plurality of forwardly extending spray guns 97. Any suitable number of spray guns may be employed to cover the required area. The outer ends of the spray guns are secured to a spacing member 93 by means of U-bolts 98. The spacing member 93 is provided with a plurality of holes for the reception of the U-bolts 98, whereby the angular relation of the spray guns to each other may be varied, as will be seen by reference to Fig. 3. While any suitable type of spray gun may be employed, I prefer to employ one such as is shown in Stockdale Patent No. 2,416,719, dated March 4, 1947. Such spray guns are well known in the art and require no detail description. As is well known, the intensity and character of the stream thrown by such guns may be varied by adjusting the nozzles thereof by turning the knurled handles 99. Each of the spray guns is manually controlled, by means of a handle 101 and trigger mechanism 102 whereby they may be opened or closed as required. Connected to the spacing member 93, near the mid-portion thereof, is a brace 103 which extends downwardly and rearwardly and is secured to the upper pipe section 88. Secured to the manifold 31 and extending rearwardly therefrom are a pair of handles 104 and 106 for the manual manipulation of the spray manifold.

Figures 8, 9:
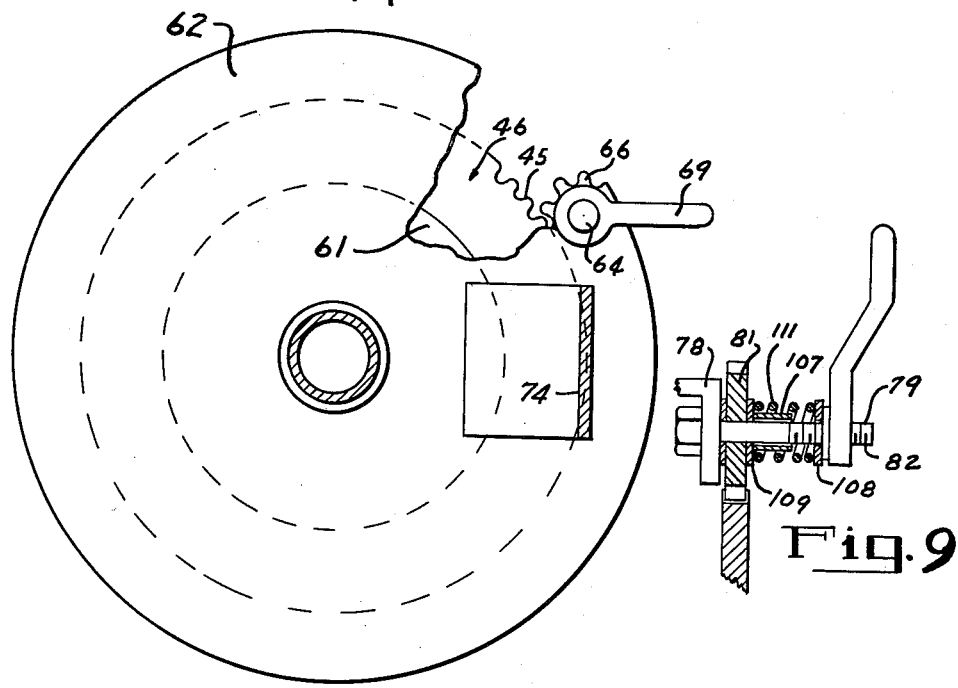
Fig. 8 is a sectional view taken along the line VIII—VIII of Fig. 4.
Fig. 9 is a detail sectional view showing mechanism for frictionally retarding the rotation of one of the sets of gears associated with the joints, and constituting a slightly modified form of my invention.

Referring now to Fig. 9, I show a slightly modified form of gear arrangement which may be used with either of the joints heretofore described. The object of this arrangement is to permit the gears to be either locked together or, if desired to adjustably increase the force required to rotate the same, making the joint or joints stable in given positions. As shown, I may extend the pinion shaft 79, providing the threaded outer end 82 thereof as already described. Between the nut 83 and the pinion 81 I may place a sleeve 107. Next to the nut and pinion are washers 108 and 109. Interposed between the washers is a compression spring 111 loosely surrounding the sleeve 107. The sleeve 107 is shorter than the spring, whereby the nut may be run in, compressing the spring before contacting the sleeve. This increases the resistance to rotation of gear 81. By running the nut in until it contacts sleeve 107, the pinion may be locked as already explained.

From the foregoing description, the operation of my improved apparatus will be readily understood. In operation, either one or both of the motors 11 or 12 may be operated, but preferably only one at a time is operated. If both sides of the track is to be sprayed at the same time, two workmen are employed and the liquid under pressure from the pump in operation is directed, by suitable manipulation of the valves, to both of the spray manifolds 29 and 31. Each operator stands between the handles 104 and 106 of a manifold and grasps them to manipulate the manifolds. Through the means of the gears 66 and 46 and the lower rotary joint, the manifold may be rotated in a horizontal plane. Should it be required to raise or lower the outer ends of the spray guns 97 to direct the spray upwardly or to lower it, the handles 104 and 106 may be depressed, or elevated, as required to rotate the spray manifold about the upper joint 86, 87. If it becomes necessary to tilt the spray manifold with respect to the horizontal, one of the handles 104 or 106, as the case may be, is depressed and the other raised, to rotate the spray head and spray guns in a vertical plane about the horizontal axis of the intermediate joint 54, 71. By this means, the area to be sprayed may be readily covered by the operator and the spray guns elevated or lowered, or shifted from side to side as may be required without any great exertion of manual labor. If desired the pinions at the rotary joints may be locked to retain the manifold in any selected position.

When the apparatus is to be used for spraying railroad rights of way it is preferable that the supporting stand 44 terminate approximately five feet above the floor of the vehicle on which the apparatus is mounted. The workman operating the apparatus stands on the platform 28 between the handles 104 and 106 in which position he is within ready reach of the controls for the spray guns 97.

While the apparatus is in operation, it is also contemplated that a part of the liquid under pressure will be returned to the supply vehicle through the conduit 32 or 33, as the case may be to provide agitation and remixing of the chemicals.

If it is desired to selectively frictionally secure the joints or to lock the same rigidly together, the apparatus shown in Fig. 9 may be associated with either or all of the joints. With the pinions of the joints frictionally restrained against rotation the entire spray apparatus remains in the positions set by the operator without the necessity of him holding the same at all times. At the same time the apparatus may be readily moved to new positions without having to unlock the gears by manipulating the nuts.

From the foregoing, it will be apparent that I have devised an improved spray apparatus which is simple and sturdy of construction and which is adapted to spray large areas readily and easily.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In spray apparatus, a rigid liquid supply conduit, a manifold connected to said supply conduit having a plurality of spray guns rigidly connected thereto, a plurality of rotary joints included in said supply conduit each comprising two parts rotatable with respect to each other and with the parts of adjacent joints rotating in planes normal to each other, a gear fixed to one part of each joint, a shaft carried by the other part of each joint, gears rotatably mounted on said shafts meshing with the gears on the other associated part of the joints, a sleeve surrounding said shafts of less length than the shafts, compression springs surrounding the sleeves, a threaded section on the outer ends of the shafts, and nuts on the threaded sections of the shafts disposed selectively to compress the springs and frictionally restrain the gears against rotation on the shafts and to engage the sleeves to lock the gears on the shaft.

2. In a spray apparatus, a supporting column having a rotatable base plate at the top thereof, a manifold, operating handles on the manifold, a plurality of individually controllable nozzles rigidly mounted on the manifold, a conduit supplying liquid under pressure to said manifold, a pair of swivel joints in said conduit each rotatable in a vertical plane, a third swivel joint having one part rigidly connected to the supply conduit, and having an L portion of said swivel joint rigidly connected to the rotatable base plate to rotate in a horizontal plane, all of said swivel joints being rotatable by means of said manifold handles at selected intervals.

3. Apparatus as defined in claim 2 in which the column base plate carries a fixed gear meshing with a rotatable gear carried on a shaft connected to the section of the conduit above the first vertical swivel joint and in which means are provided to lock said rotatable gear and joint at selected intervals.

4. In spray apparatus, a manifold, a plurality of individually controllable nozzles rigidly mounted on the manifold, a conduit supplying liquid under pressure to said manifold, a lower swivel joint in said conduit rotatable in a horizontal plane only and having a non-rotatable part rigidly connected to said conduit, at least one upper swivel joint in said conduit disposed above the lower joint, said upper swivel joint having a non-rotatable part and a rotatable part adapted for rotation in a vertical plane only and at angles to each other, a gear secured to the non-rotatable part of each swivel joint, a second gear mounted for rotation on the rotatable part of each swivel joint and meshing with the first mentioned gear, releasable means associated with said second gear of each joint and operable to restrain the same against rotation, and operating handles on the manifold by means of which all of said joints are manually rotatable singly and collectively.

5. In spray apparatus, a manifold, a plurality of individually controllable nozzles rigidly mounted on the manifold, a conduit supplying liquid under pressure to said manifold, a lower joint in said conduit rotatable in a horizontal plane, a pair of elbow swivel joints in said conduit disposed above the lower joint and rotatable in vertical planes at angles to each other, gear means operatively connected to both of said joints and rotatable with said joints, a coil spring associated with at least one gear of each joint and operable to restrain the same against rotation, said spring having one end bearing against the gear and an adjusting member operable to compress the spring, and operating handles on the manifold by means of which all of said joints are manually rotatable.

6. In mobile spray apparatus adapted for mounting on a railroad vehicle, a substantially vertical conduit, means supplying liquid under pressure to said conduit, a manifold, a plurality of spray nozzles communicating with said manifold and rigidly attached thereto, a plurality of freely rotatable swivel joints between the vertical conduit and said manifold supporting the manifold for rotation, tilting and lowering relative to the horizontal position thereof, and manually operated means on the manifold for freely rotating all of the swivel joints singly and collectively.

7. Apparatus as defined in claim 6 in which each swivel joint is provided with a pair of gears, one of which is free to rotate with the swivel joint and the other is fixed against rotation, and adjustable means associated with said gear which is free to rotate and adapted selectively to restrain or lock the same against rotation.

JOHN P. QUARLES.

REFERENCES CITED

The following references are of record in the file of this patent:

UNITED STATES PATENTS

| Number | Name | Date |
|---|---|---|
| 864,910 | O'Neill | Sept. 3, 1907 |
| 1,880,272 | Panther | Oct. 4, 1932 |
| 2,290,350 | Olches | July 21, 1942 |
| 2,301,496 | Aldrich | Nov. 10, 1942 |
| 2,365,755 | Griffith | Dec. 26, 1944 |
| 2,501,639 | Warren | Mar. 21, 1950 |
| 2,507,668 | Hamilton | May 16, 1950 |

FOREIGN PATENTS

| Number | Country | Date |
|---|---|---|
| 320,294 | Great Britain | Oct. 10, 1929 |